C. C. McCLAIN.
NUT LOCK.
APPLICATION FILED JAN. 19, 1912.
1,058,771.
Patented Apr. 15, 1913.
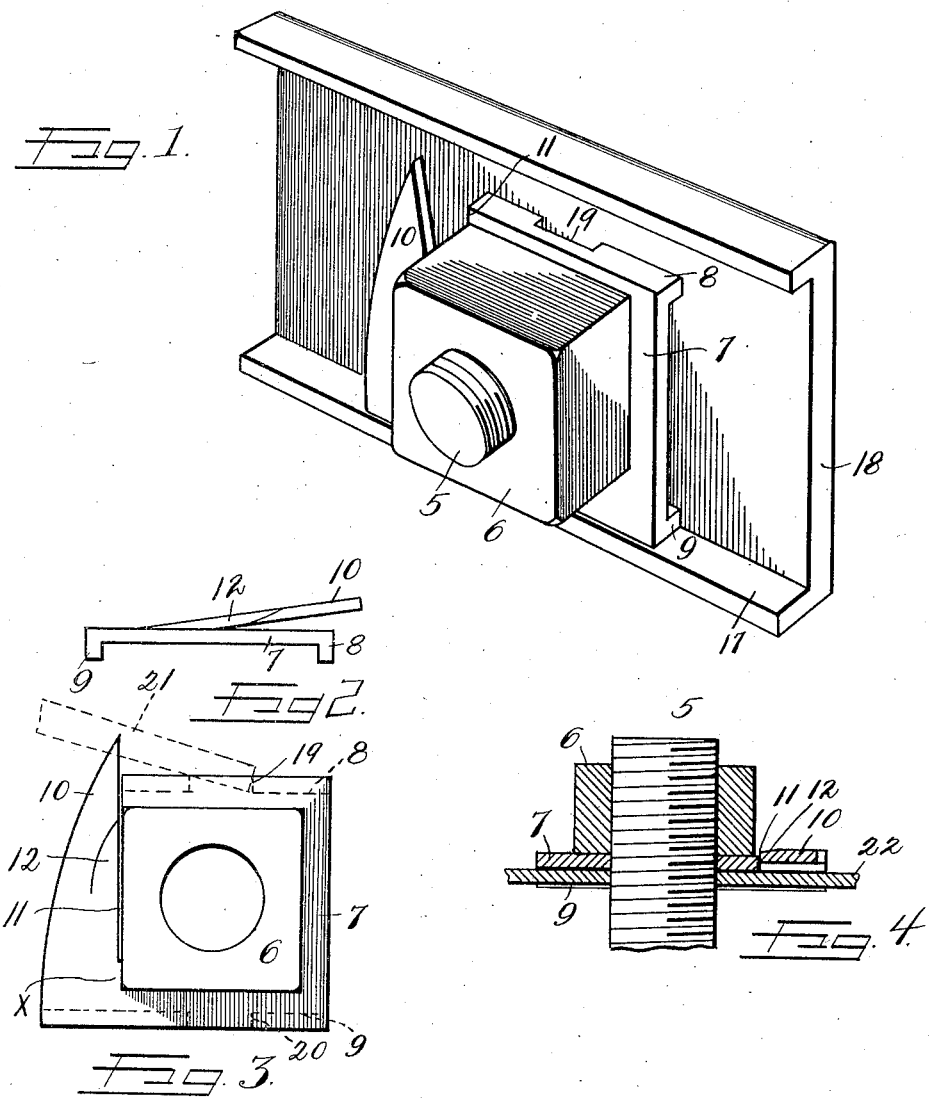
Inventor
Charles C. McClain,
By Shepherd & Campbell,
Attorneys
Witnesses
Nevelle Lyles
Carrie Schmidt

UNITED STATES PATENT OFFICE.

CHARLES C. McCLAIN, OF WASHINGTON, DISTRICT OF COLUMBIA.

NUT-LOCK.

1,058,771.  Specification of Letters Patent.  Patented Apr. 15, 1913.

Application filed January 19, 1912. Serial No. 672,100.

*To all whom it may concern:*

Be it known that I, CHARLES C. MCCLAIN, a citizen of the United States of America, residing at Washington, in the District of Columbia, have invented certain new and useful Improvements in Nut-Locks, of which the following is a specification.

This invention relates to nut locks, and has for its object the provision of a lock washer which is adapted to hold the nut against turning with relation to the bolt upon which it is screwed, and which washer may be used with standard nuts and bolts without making any changes in the construction of said nuts and bolts.

A further object of the invention is the provision of a lock washer of the character above described, provided with improved means for readily releasing it from engagement with the nut, when desired.

Further objects and advantages of the invention will be set forth in the detailed description which now follows.

In the accompanying drawing Figure 1 is a perspective view illustrating the application of my improved lock washer to a railway fish plate. Fig. 2 is an edge view thereof. Fig. 3 is a front elevation of the washer and nut. Fig. 4 is a horizontal sectional view showing the washer in engagement with a retaining strap, hereinafter described.

Like numerals designate corresponding parts in all of the figures of the drawing.

Referring to the drawing, 5 designates a bolt and 6 a nut of the usual and well known construction. The lock washer comprises a body portion 7, inturned upper and lower flanges 8 and 9 and a preferably resilient tongue 10. This tongue is formed by slitting the metal at 11, and that edge of the tongue nearest the nut is cut away at 12 to form a curved face, which gradually diminishes in width toward the top of the tongue.

It is apparent that if desired, the tongue 10 may be made of other than resilient material, and may lie flat and in the plane of the body 7 until the nut has been entirely screwed up, after which the tongue 10 may be bent outwardly to engage the side of the nut, as shown in Fig. 2. It will be noted that the lower edges of the tongue 10 and the body 7 form a continuous straight edge which rests upon the base flange 17 and fish plate 18, whereby the washer is effectually held against turning. In addition to holding the washer against turning, this feature of having the lower straight edge of tongue 10 also rest upon the flange 17 backs up and braces the tongue 10 to resist any strain brought thereon by the tendency of the nut to unscrew, which strain, if the tongue were not braced in this manner, would tend to break the tongue off at point X (see Fig. 3.) The flanges 8 are cut through at 19 and 20, this cutting through of the flanges serving in the case of the upper flange to permit the insertion of an end of a tool shown in dotted lines at 21 in Fig. 3, to enable the operator to press the tip of the tongue 10 inwardly when it is desired to remove the nut.

A further function of the flanges 8 and 9 is to permit of the use of the device in conjunction with ordinary nuts and bolts in other relations than that shown in Fig. 1. That is, it is often desired to employ nut locks in other places than upon fish plates, and in places where there is no member corresponding to flange 17. In these cases, the bolts may be caused to pass through the members to be held and in addition, to pass through a bar, one of which is indicated at 22 in Fig. 4, this bar lying between the flanges 8 and 9, and engaging said flanges to prevent rotation of the washer. This structure is particularly adapted for use where a number of bolts are disposed in a row, all of said bolts passing through the bar 22, whereby the bar is firmly held in place.

The structure hereinafter shown and described, has been found to be a particularly advantageous and efficacious one for the following reasons. First, it is very inexpensive, being made of a single piece of sheet metal and being so constructed that it may be stamped out at a single operation, and second, because it does not depend for its efficacy upon any change in the nut and bolt itself, but upon the contrary, is adapted for use with standard nuts and bolts now on the market. The cutting away of flange 9 at 20 permits the escape of water from the recess formed in the rear of the washer, and thereby aids in preventing rusting of the parts.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview, such changes as may be made within the scope of the appended claim.

Having described my invention what I claim is:—

A lock washer comprising a body portion having an opening formed therein for the passage of a bolt, said lock washer being formed from a single piece of material of uniform thickness and being cut vertically from its upper edge to a point adjacent its lower edge at one side of said opening to form a tongue adapted to be bent outwardly beyond the plane of the body portion, the upper and lower edges of said body portion being inturned to form flanges, the length of said tongue being such as to cause it to project above said flanges and the uppermost of said flanges being vertically recessed for the reception of a tool, said tongue being of such length that a tool engaged in said recess will bear upon said tongue for the purpose of forcing the same inwardly.

In testimony whereof I affix my signature in presence of two witnesses.

CHARLES C. McCLAIN.

Witnesses:
 NEVELLE LYLES,
 CARRIE SCHMIDT.

Copies of this patent may be obtained for five cents each, by addressing the "Commissioner of Patents, Washington, D. C."